United States Patent [19]

de La Celle

[11] 3,752,487

[45] Aug. 14, 1973

[54] TAPE RECORDER CONTROLLING DEVICE

[76] Inventor: Guy Etienne de La Celle, 6, rue Marengo, Bordeaux, France

[22] Filed: Mar. 4, 1971

[21] Appl. No.: 120,999

[30] Foreign Application Priority Data

Mar. 9, 1970 France .............................. 7008368

[52] U.S. Cl. .............................................. 274/4 A

[51] Int. Cl. .............................................. G11b 5/54

[58] Field of Search .................... 274/4 R, 4 A, 4 B, 274/4 C, 4 E, 11 A, 11 B, 11 C, 11 D; 179/100.2 CA; 242/199, 201, 203, 200, 208

[56] References Cited

UNITED STATES PATENTS

| | | | |
|---|---|---|---|
| 3,547,446 | 12/1970 | Kern | 274/4 D |
| 3,073,540 | 1/1963 | Guest | 274/4 R |
| 3,606,202 | 9/1971 | Williams et al. | 274/4 R |
| 3,445,116 | 5/1969 | Knox | 274/4 A |

FOREIGN PATENTS OR APPLICATIONS

| | | | |
|---|---|---|---|
| 866,351 | 4/1961 | Great Britain | 274/4 D |

*Primary Examiner*—Harry N. Haroian
*Attorney*—Baldwin, Wight & Brown

[57] ABSTRACT

A single operating member for controlling tape recorders of the type having slow forward movement of the tape for reproducing or recording, fast forward movement of the type, and fast rewinding of the tape. The operating member comprises two portions pivotally connected to each other. One portion supports the magnetic head. In its rest position the magnetic head is spaced from the tape which may have a plurality of recording tracks. By pushing in the operating member the magnetic head is brought into engagement with the tape and a switch operatively connected to the operating member effects the movement of the tape at a slow forward speed. Fast forward and rewinding movement of the tape are effected by rotating the portion of the operating member remote from the magnetic head to one side and the other of a central rest position. In the fast forward or rewinding positions, the magnetic head can not be brought into contact with the tape. A vertical movement of the operating member enables the magnetic head to be brought into operative engagement with the various tracks of the tape. The operating member is locked in the recording or reproducing position and is released by the energization of an electromagnet by means of conductive segments on the tape.

15 Claims, 5 Drawing Figures

Inventor:
Guy Etienne de la Celle
BY Baldwin Wight & Brown
Attorneys

Inventor:
Guy Etienne de la Celle
BY Baldwin Wight & Brown
Attorneys

Inventor:
Guy Etienne de la Celle
BY Baldwin Wight & Brown
Attorneys

TAPE RECORDER CONTROLLING DEVICE

BACKGROUND OF THE INVENTION

The present invention relates to reading and recording devices for tape recorders and in this respect concerns the field of magnetic recording devices.

In the following description reference will be made exclusively to reading or reproducing devices for magnetic tape, however, it should be understood, as is generally the case, the elements described may be also used for recording devices.

Beyond the operation of tape recorders wherein the tape is driven at a relatively low speed past a reproducing head in order to acoustically reproduce sound information recorded on the tape , tape recorders are provided with means for moving the tape at a relatively high speed in one direction or the other in order to wind the tape on the winding reel or rewind the tape on the unwinding reel, as well as for stopping the tape at any desired point,the position of being determined by suitable locating means.

The invention concerns such devices.

PRIOR ART

A disadvantage of such known devices resides in the fact that they are provided with several control buttons or levers for effecting the different operations. In fact three are provided, i.e., one for reproducing at a slow forward speed, one for forward winding without reproducing at a fast forward speed, and one for rewinding at a fast speed also without reading. Means are provided to make these operations mutually exclusive. Such a complication is a drawback.

SUMMARY OF THE INVENTION

The invention in overcoming this drawback and simplifying the control of the tape recorder is valuable in particular in its application to the reading of large capacity information or data storage means comprising multi-track magnetic tape from which data must be extracted quickly and easily.

To this end and according to the invention, a single lever is supported in such a manner to be displaced into at least three positions, i.e., one corresponding to reproducing, one corresponding to fast forward movement of the tape without reproducing and a third corresponding to fast rewinding without reproducing.

According to a preferred embodiment the lever comprises at its end a reading or reproducing head and depressing the lever from a rest position causes the reading or reproducing head to be applied against tape at the same time as the starting of the slow unwinding or forward movement of the tape, whereas the displacement of the lever to one side or the other of the rest position effects the movement of in a direction or in an opposite direction at a high speed. Further, there are preferably as many reading or reproducing positions distributed along a plane passing through the axis of the lever and perpendicular to the tape, each involving the inward movement or depression of the lever suitably supported and pivotally mounted for this effect, as there are parallel tracks on the tape.

The description which follows with reference to the accompanying drawings made by way of non-limiting example will enable the understanding of the invention,the features shown in the drawings as well as those brought out in the description are part of the invention.

DESCRIPTION OF A PREFERRED EMBODIMENT

Figure 1:
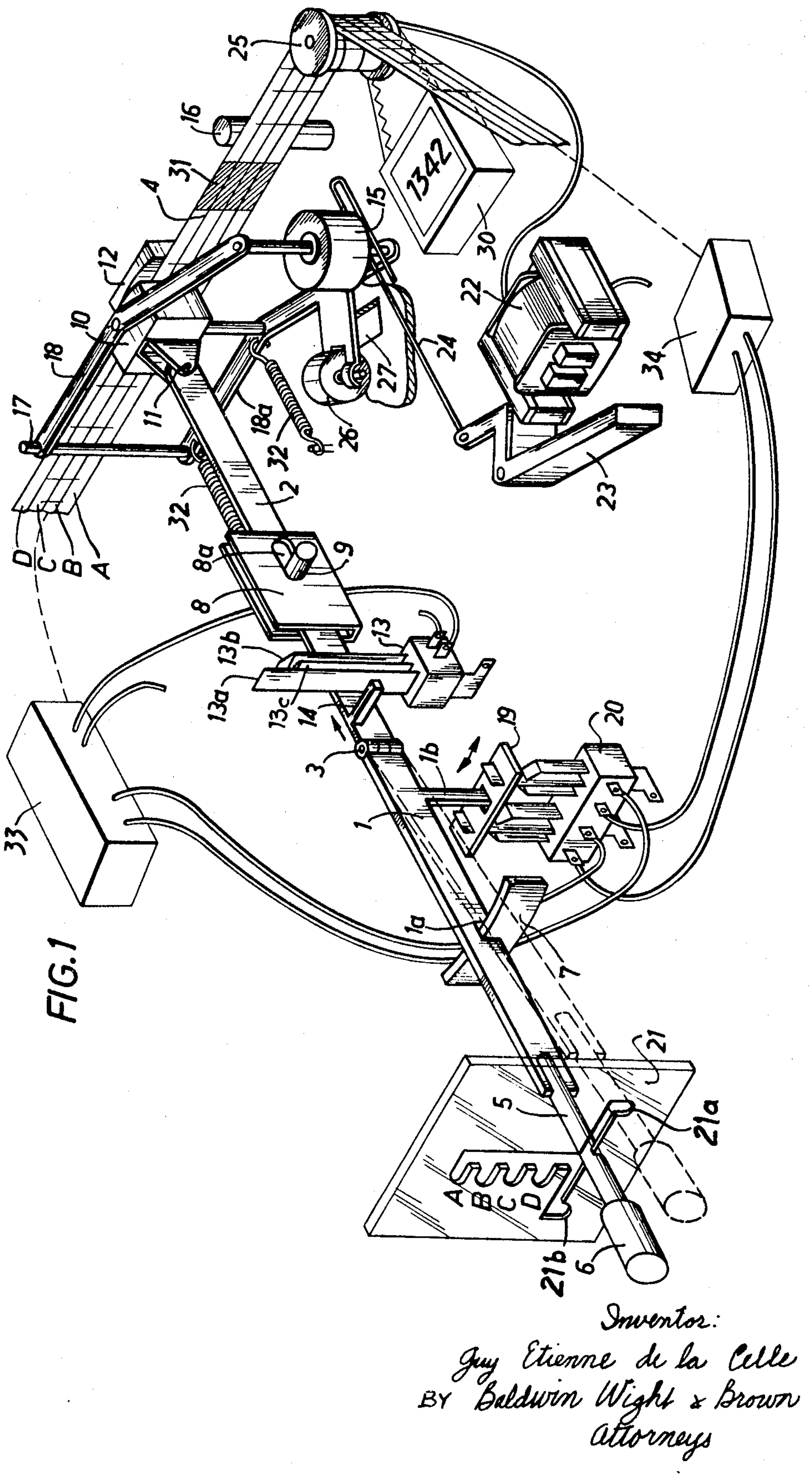
FIG. 1 shows a general view in perspective of a device according to the invention,its rest or stop position being shown in solid lines.

The device according to the invention and illustrated in the drawings shows a "single control lever" having two portions 1 and 2 connected by pivot means 3. Each of these portions has the shape of a flat plate which is preferably metal. The lever 1–2 is in a substantially horizontal position as is at least the portion of the tape 4 to be reproduced. The axis of the pivot means 3 is vertical. The forward lever portion 1 is provided with an extension 5 and an operating knob 6. Towards the middle of the lever portion 1 is a notch 1a and in the stop or rest position of the control lever the notch 1a straddles a curved vertical plate 7, the center of curvature of the plate being along the axis of the pivot means 3. Thus in the stop position it is not possible to move the lever 1–2 inwardly. On the other hand, the lever portion 1 can be horizontally displaced from side to side with respect to the median position shown in solid lines in FIG. 1. For example,the lever portion 1 can be moved into the dotted-line position shown in this figure. The lever portion 2 can not follow this lateral horizontal displacement owing to a guide 8 formed by two plates situated at either side thereof. One of the plates is provided with a slot 8*a* through which extends a pin 9 fixed to the lever portion 2. The purpose of this pin and slot connection is to limit the path of inward-outward movement of the control lever. This inward-outward movement will be explained hereinbelow.

A reading head 10 is supported at the end of the lever portion 2 by a horizontal pivot means 11. The reading head 10 is spaced at a certain distance from the tape 4 in the stop position. A tape backing plate or fixed support 12 is situated at the other side of the tape. In order to move the lever to its reading position,it must first be lifted upwards to disengage the notch 1a from the plate 7. In fact there is not one but a plurality of positions of the lever, for example four positions, corresponding to notches A,B,C, D, provided, for example, in the recorder case of which only a portion 21 is shown. Each of these positions corresponds to a different track on the magnetic tape; the axis of rotation of the lever portion 2 in order to move from one track to another is defined by the cooperation of the slot 8a and the pin 9.

The tape 4 may be driven in opposite directions and at different speeds in any conventional manner. Since the tape drive per se forms no part of this invention, the tape drive has been schematically illustrated as including a two speed tape wind unit 33 and a high speed rewind unit 34. If desired, a single motor (not shown) could drive both the units 33,34 in a conventional manner.

After being lifted up, the lever 1—4 is moved inwards a distance limited by the slot 8*a*, the reading head 10 moves into contact with the tape which permits reading since the tape is put into slow forward movement in the unwinding direction by a lug 14 on the lever portion 2 bringing contact blades 13*a* and 13*c* of a switch 13 into engagement and thus closing the switch 13. At the same time the reading amplifier is put into operation by bringing a contact 13b of the switch 13 into engagement with contact 13*a*, and positioning pressure roller 15 mechanically operated by the inward movement of the lever comes to urge the tape 4 against a roller 16. A pin 17 is fixedly mounted on the apparatus and a double lever 18–18*a* carrying the pressure roller 15 is attached at an intermediary point to the reading head 10 for pivotal movement. A locking roller 26 resiliently mounted on the lower lever 18*a* engages a groove 27 provided in another partially illustrated portion of the case 21, and locks the device in its reading or reproducing position.

Figures 2, 3:
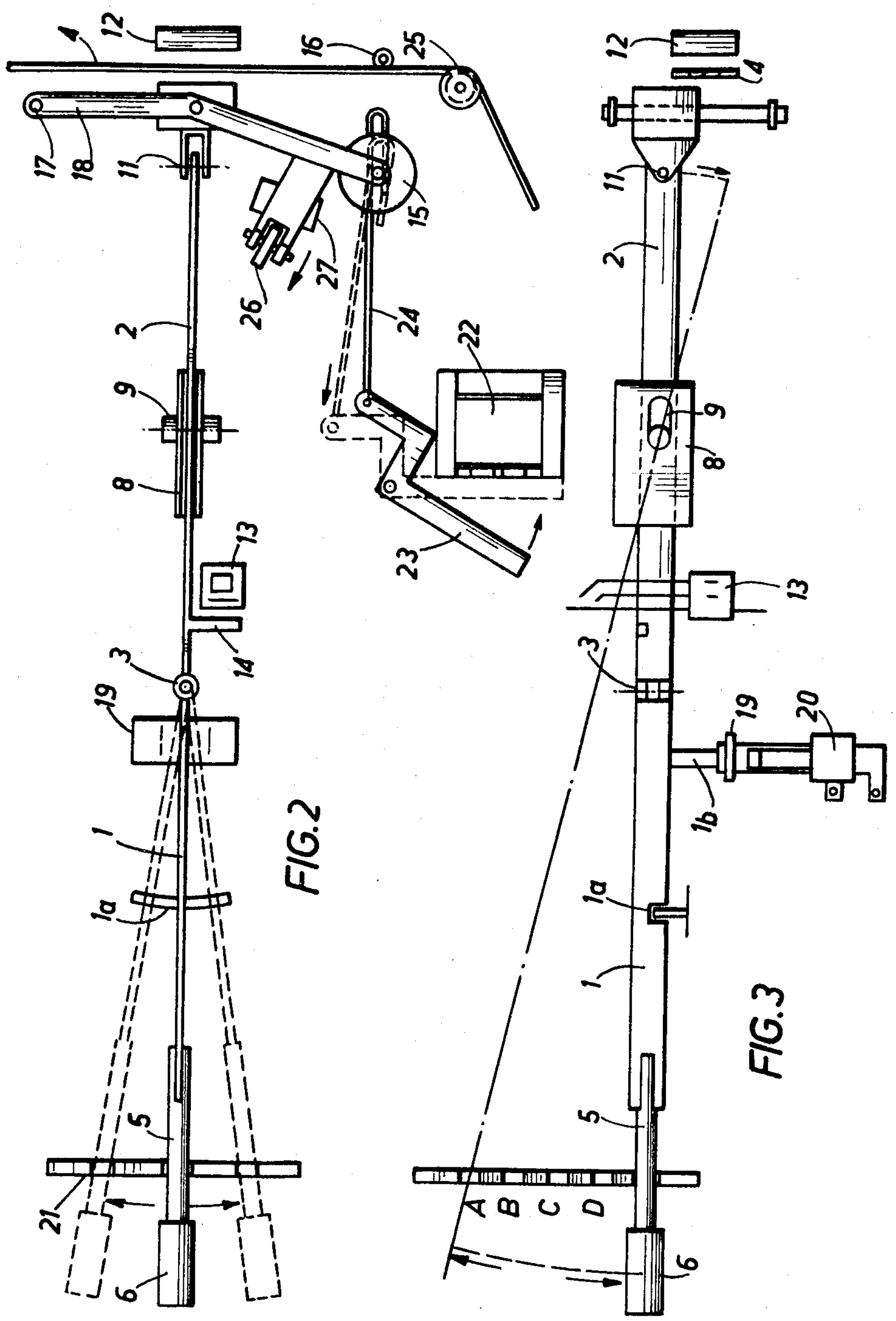
FIG. 2 is a schematic plan view of the device of FIG. 1 with parts omitted for purposes of clarity.
FIG. 3 is a schematic elevation view of the device in FIG. 1.
Figures 4, 5:
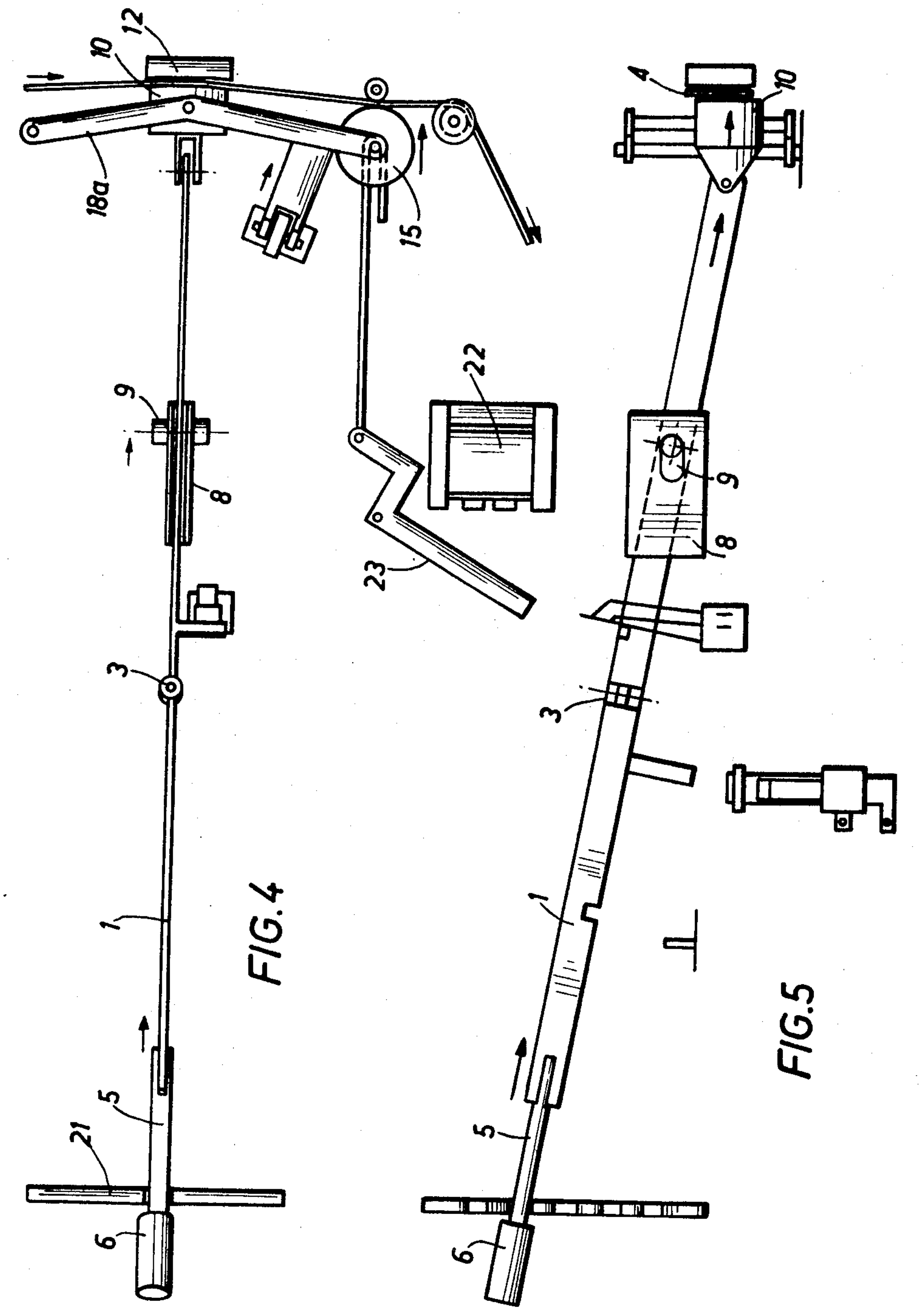
FIG. 4 is a schematic plan view of the device in FIG. 1 with parts omitted for purposes of clarity.
FIG. 5 is a fragmentary elevation view of the device corresponding to FIG. 4.

In order to unwind or rewind the tape,the lever 1–2 is put into one of its dotted-line positions as shown in FIG. 2. The lever portion 1 of the control lever includes a lug 1*b* downwardly directed and extending into a slot provided in an actuating plate 19 which actuates the contact blades of a double-pole double-throw switch 20 which closes the supply circuit of a motor for driving the tape in one direction or the other. This manipulation of the lever 1–2 is only possible if the extension 5 passes into the guide slots 21*a* and 21*b* to the right and left thereof. In other words the notch 1a must straddle the plate 7, and therefore the lever 1–2 cannot be moved to its inward position.The pressure roller 15 is not in contact with the tape which can be moved rapidly.

Such rapid or fast movement in one direction or the other is particularly useful for rapidly and very conveniently finding a predetermined place on one of the tracks of the tape by the manipulation of the single control lever 1–2. To this end a conventional locator or meter 30 is provided and connected to tape guide 25 and chain-driven therefrom in order to avoid any slipping and to insure precision in locating. Such a meter or locator does not comprise a zero-setting device and will advantageously be provided with a magnifying reading window lens for reading.

Each of the tracks of the tape 4 is divided into sections containing information or data which can be extracted and reproduced by the apparatus, these sections are divided by silver or other equivalent contacts 31 which enables the closing the electric circuit of an electromagnet 22 in passing along the tape guide 25 suitably equipped. The electromagnet 22 has an armature 23 with an elbow and a rod 24 which cause the return of the pressure roller 15 by separating elements 26 and 27 and consequently by the rotation of the lever 18 and under the effect of return springs 32 the return of the control lever 1–2 to the stop position.

The possible applications of an apparatus such as the one which has just been described are numerous. Some examples are as follows :

oral instructions for the operation or maintenance of a relatively complicated apparatus accompanying a schematic diagram with reference numerals,the different parts of the apparatus being orally explained as desired;

an apparatus for public use which provides information or music mixed with advertizing announcements;

in a slightly analogous manner, an apparatus mounted on cars placed at the service of customers in stores especially department stores,for providing information concerning different departments and auxiliary information;

coin-operated juke-boxes for bars or restaurants;

oral menus for restaurants including an "electronic wine-waiter"; and oral guides in museums etc.

Such an apparatus is also adapted to constitute a sort of library comprising numerous cassettes for encyclopedic uses or relative to a particular subject or for storing various procedures or operations of a business concern or an administration.

What I claim is:

1. In a tape recorder of the type having drive and guide means for effecting the movement of a tape along a predetermined path, and a head engageable with a guided tape, first control means for slow forward movement of the type, second control means for fast forward movement of the tape, third control means for rewinding the tape, a single operating member for selectively individually actuating each of said control means,said operating member having a first control position for slow forward movement of the tape, a second control position for the fast forward movement of the tape, a third control position for rewinding the tape and a fourth control position in which the tape is at rest, said operating member including means at one end thereof for mounting thereon for movement therewith said magnetic head, a guide member adjacent the other end of said operating member for defining paths of movement of said operating member other end, mounting means mounting said operating member one end for controlled axial movement to engage said head with a tape during movement of said operating member to said first control position and the actuation of said first control means, and stop means cooperable with said guide member for preventing axial movement of said operating member when said operating member is in any one of said second, third and fourth control positions and during movement there-between, said stop means being operable for preventing engagement of said head with a tape in all positions of said operating member with the exception of said first control position, and said mounting means including pivot means pivotally mounting said operating member for disengagement from said stop means in said first control position.

2. A device according to claim 1, wherein the device is adapted to receive a tape having a plurality of tracks and said mounting means for said operating member enables the vertical displacement of the operating member for selectively positioning the head relative to each one of said tracks, and said guide member further comprising means for maintaining the operating member in each such selected position.

3. A device according to claim 2 wherein said operating member is formed of first and second portions connected together by a transverse pivot disposed generally parallel to that portion of said tape path aligned with said head, said first portion having thereon said means for mounting said head and being engaged by said mounting means, and said second portion being engaged by said stop means and said guide member.

4. A device according to claim 3 wherein said stop means includes cooperating surfaces on said stop means and said actuating member for permitting pivoting of said second portion relative to said first portion while continuing to prevent axial movement of said operating member.

5. A device according to claim 4 wherein said cooperating surfaces are of the type readily disengageable during movement of said operating member generally parallel to the axis of said pivot between said fourth and first control positions.

6. The device of claim 5 wherein said guide member includes means for preventing pivoting of said second portion relative to said first portion when said operating member has pivoted at said pivot means to a position disengaging said cooperating surfaces.

7. A device according to claim 4 wherein said second and third control means include separate control means for said tape drive selectively individually operable only in response to selective pivoting of said second portion relative to said first portion to said second and third control positions.

8. The device of claim 7 wherein said first control means include control means for said tape drive operable only in response to axial movement of said operating member.

9. A device according to claim 3 wherein said second and third control means include separate control means for said tape drive selectively individually operable only in response to selective pivoting of said second portion relative to said first portion to said second and third control positions.

10. A device according to claim 3,further comprising a pressure roller and means cooperating with said operating member for moving said pressure roller into engagement with the tape in said first control position.

11. A device according to claim 10, wherein the tape has conductive segments dividing said tape into a plurality of sections, electro-magnetic means for releasing the pressure roller and for moving the operating member from said first control position to said fourth control position, and means operable by the passage thereby of one of said conductive segments for energizing said electro-magnetic means.

12. A device according to claim 11,further comprising means for locking the operating member in said first control position and wherein the electromagnetic means upon energization effects the release of said means for locking .

13. A device according to claim 3, further comprising a first switch means operatively connected to said second portion for effecting the fast movement of the tape in said second and third control positions.

14.A device according to claim 13,further comprising a second switch means operatively connected to said first portion for effecting the slow forward movement of the tape.

15. A device according to claim 3, wherein said second portion includes notch means and said device further comprising a stationary curved member engaging said notch means for preventing the movement of the magnetic head into engagement with the tape in said second and third control positions, the center of curvature of the curved member coinciding with the axis of the pivotal connection of said first and second portions.

* * * * *